United States Patent
Van Bijnen et al.

(10) Patent No.: US 7,616,046 B2
(45) Date of Patent: Nov. 10, 2009

(54) SYSTEM COMPRISING AN ELECTRICAL BRIDGE FOR GENERATING AN ELECTRICAL SIGNAL FOR A LOAD AND A CONTROL UNIT FOR SUCH A SYSTEM

(75) Inventors: Johannes Henricus Van Bijnen, Eindhoven (NL); Peter Humphrey De La Rambelje, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 998 days.

(21) Appl. No.: 10/502,730

(22) PCT Filed: Dec. 23, 2002

(86) PCT No.: PCT/IB02/05705

§ 371 (c)(1),
(2), (4) Date: Jul. 27, 2004

(87) PCT Pub. No.: WO03/065561

PCT Pub. Date: Aug. 7, 2003

(65) Prior Publication Data

US 2005/0116762 A1 Jun. 2, 2005

(30) Foreign Application Priority Data

Jan. 30, 2002 (EP) .................................. 02075358

(51) Int. Cl.
*H03K 17/74* (2006.01)
(52) U.S. Cl. ...................... 327/494; 327/508
(58) Field of Classification Search ......... 327/172–176, 327/423, 424, 494, 496, 497, 508, 588; 330/10
See application file for complete search history.

(56) References Cited

U.S. PATENT DOCUMENTS

| | | | | |
|---|---|---|---|---|
| 5,057,720 A | * | 10/1991 | Hattori | 327/424 |
| 5,309,347 A | * | 5/1994 | Poma et al. | 363/63 |
| 5,550,498 A | * | 8/1996 | Kwan et al. | 327/175 |
| 5,589,805 A | * | 12/1996 | Zuraski et al. | 332/109 |
| 5,939,931 A | * | 8/1999 | Noro | 327/424 |
| 5,952,856 A | * | 9/1999 | Horiguchi et al. | 327/110 |
| 5,973,527 A | * | 10/1999 | Schweighofer et al. | 327/172 |
| 6,040,954 A | * | 3/2000 | Tanghe | 360/68 |
| 6,373,298 B1 | * | 4/2002 | Teterud et al. | 327/110 |
| 6,377,109 B1 | * | 4/2002 | Yama | 327/423 |
| 6,388,477 B1 | * | 5/2002 | Juang | 327/112 |
| 6,525,592 B2 | * | 2/2003 | Gentinne et al. | 327/423 |
| 6,617,913 B1 | * | 9/2003 | Johnson | 327/423 |
| 6,753,717 B2 | * | 6/2004 | Inoue et al. | 327/423 |
| 6,867,645 B1 | * | 3/2005 | Ansari et al. | 327/588 |

* cited by examiner

*Primary Examiner*—Lincoln Donovan
*Assistant Examiner*—Hai L Nguyen

(57) ABSTRACT

A System for generating a PWM output voltage signal include a first half bridge having a first set of switches, and a second half bridge having a second set of switches. A control unit is configured to generate a first PWM switch-signal for switching the first set of switches; to generate a second PWM switch-signal for switching the second set of switches; and to vary at least one of pulse widths and phases of the first and second PWM switch-signals relative to each other for varying a pulse width of a PWM output voltage signal so that the PWM output voltage signal equals zero when the pulse widths of the first and second PWM switch-signals are equal to each other.

15 Claims, 5 Drawing Sheets

SYSTEM COMPRISING AN ELECTRICAL BRIDGE FOR GENERATING AN ELECTRICAL SIGNAL FOR A LOAD AND A CONTROL UNIT FOR SUCH A SYSTEM

The invention relates to a system for generating a PWM output voltage signal for a load, wherein the system comprises a first half bridge and a second half bridge, wherein the first half bridge comprises a series connection of a first switch and a second switch and wherein the second half bridge comprises a series connection of a third switch and a fourth switch, wherein the first half bridge and the second half bridge are connected between a first rail and a second rail for supplying a DC voltage over the first and second half bridge, and wherein, in use, the load is connected between a first junction of the first switch and the second switch and a second junction of the third switch and the fourth switch, and wherein the system also comprises a control unit for generating at least a first PWM switch-signal for switching the switches of the first half bridge and at least a second PWM switch-signal for switching the switches of the second half bridge, wherein the control unit is arranged for varying the pulse widths and/or the phases of the first and second PWM switch-signals relative to each other for varying the pulse width of the PWM output voltage signal.

Furthermore, the invention relates to a control unit of the system for generating a PWM output voltage signal for a load.

The said system for generating a PWM output voltage signal for a load is known in actual practice and can for example be used for driving an electrical motor, wherein the load is a coil of the electrical motor.

In a first mode of the known system the first and second PWM switch-signals are generated in such a way that the first switch switches between a conduction state and a non-conduction state in dependence of the first PWM switch signal, while the fourth switch is in a conduction state and the second and third switch are in a non-conduction state. In this first mode an electrical current flows through the load in a first direction if the first switch is in a conduction mode. The control unit can control the current, for example by switching the first switch with the first switch-signal. When the first PWM switch-signal is "high" the first switch is in a conduction state and when the first PWM switch-signal is "low" the first switch is in a non-conduction state.

In a second mode of the known system the first and second PWM switch-signals are generated in such a way that, while the third switch switches between a conduction and a non-conduction state in dependence of the second PWM switch-signal, the first switch and the fourth switch are in a non-conduction state, and the second switch is in a conduction state. In this second mode an electrical current flows through the load in a second direction which is opposite to the first direction if the third switch is in a conduction state. The control unit can control the current by switching the third switch with the second PWM switch signal. When the second PWM switch-signal is "high" the third switch is in a conduction state and when the second PWM switch-signal is "low" the first switch is in a non-conduction state.

A third mode of the known system is the transition mode between the first mode and the second mode and vice versa. In the third mode the first and second PWM switch-signals are generated in such a way that all switches are in a non-conduction state, such that a short-circuit between the first and second rail is prevented.

A disadvantage of the known system is that for generating a zero PWM output voltage signal the control unit switches the system between the first mode and the second mode. As a consequence of this, the electrical current through the load is non-zero at zero-crossings of the PWM output voltage signal. Thus, although in the zero crossing region of the PWM output voltage signal the mean value of the current is zero, the current itself is non-zero. The non-zero current results in a development of heat in the load which can damage the load.

Although it seems a simple solution to provide the system with additional switches for disconnecting the load from the half bridges or to switch the present switches in non-conduction states this leads unwanted new disadvantages. Additional switches yield an expensive system and switching off all present switches for generating a zero PWM output voltage signal yields a complicated control unit.

It is an object of the invention to meet into the said disadvantage without the said unwanted new disadvantages. For this, the invention provides a system for generating a PWM output voltage signal for a load which is characterized in that, for generating a zero PWM output voltage signal, the control unit is arranged to generate the first PWM switch-signal and the second PWM switch-signal such that the respective pulse width and phase of the first PWM switch-signal and the respective pulse width and phase of the second PWM switch-signal are, at least substantially, equal. Since, at the zero-crossings of the PWM output voltage signal, the respective pulse width and phase of the first PWM switch-signal are equal to the respective pulse width and phase of the second PWM switch-signal, the electrical current through the load is zero. Consequently, the load dissipates no electrical energy in the said zero crossing regions of the PWM output voltage signal. Thus, the system according to the invention is energy-saving and is less subject to wear than the known system.

An advantage of the system according to the invention is that it provides a way of noise-shaping. This can be explained as follows. The respective first switch-signal and second switch-signal are PWM signals for which the respective switch time points are different outside the said zero-crossing regions of the PWM output voltage signal. If the first and second switch-signal have the same first frequency then the PWM output voltage signal over the load has a second frequency which equals twice the first frequency. This frequency doubling principle offers the opportunity of noise-shaping, wherein high frequency noise can easily be filtered out by means of a lowpass-filter.

A preferred embodiment of the system according to the invention is characterized in that the control unit is arranged to generate the first PWM switch-signal and the second PWM switch-signal on the basis of a control signal, wherein the respective duty cycles of the respective first and second PWM switch-signals are continuous functions of the control signal. In this preferred embodiment, the duty cycle of the first switch signal is either a monotonous rising function of the control signal, wherein the duty cycle of the second switch signal is a monotonous descending function of the control signal, or the duty cycle of the first switch signal is a monotonous descending function of the control signal, wherein the duty cycle of the second switch signal is a monotonous rising function of the control signal. In either way, at the zero crossings of the PWM output voltage signal, the duty cycle of the first PWM switch-signal is always equal to the duty cycle of the second PWM switch-signal. Thus, there is no discontinuity at the said zero-crossings of the PWM output voltage signal. An advantage of this is that the system has highly linear characteristics. This is a result of the fact that the control system can generate the first and second switch-signals in the same way, both in and outside the zero crossing regions of the PWM output voltage signal.

In an embodiment of the system according to the invention the control unit is also arranged for generating a third PWM switch-signal and a fourth PWM switch-signal, wherein the first PWM switch-signal and the third PWM switch-signal are inversed signals with respect to each other, and wherein the second PWM switch-signal and the fourth PWM switch-signal are inversed signals with respect to each other, and wherein, in use, the first PWM switch-signal is fed to the first switch, the second PWM switch-signal is fed to the third switch, the third PWM switch-signal is fed to the second switch and the fourth PWM switch-signal is fed to the fourth switch. Since the first switch-signal and the third switch-signal are inversed with respect to each other, a short-circuit between the first rail and the second rail via the first half bridge is prevented. In an analogous way a short-circuit between the first rail and the second rail via the second half bridge is prevented.

An advanced embodiment according to the invention is characterized in that system comprises a third half bridge and a fourth half bridge, wherein the third half bridge comprises a series connection of a fifth switch and a sixth switch and wherein the fourth bridge comprises a series connection of a seventh switch and an eighth switch, wherein the third half bridge and the fourth half bridge are connected between the first rail and the second rail for supplying the DC voltage over the third half bridge and the fourth half bridge, and wherein a first motor coil of an electrical motor is connected between the first junction and the second junction, wherein a second motor coil of the electrical motor is connected between the first junction and a third junction of the fifth switch and the sixth switch, and wherein a third motor coil of the electrical motor is connected between the first junction and a fourth junction of the seventh switch and the eighth switch. The control unit can generate switch-signals for the third half bridge and the second half bridge in an analogous way as for the first half bridge and the second half bridge. The advanced embodiment is especially suited for application in for example a Compact Disc Player. In such a Compact Disc Player a motor is present for driving a laser-unit of the Compact Disc Player. A first motor coil is used for focussing the laser-unit with respect to a compact disc in the Compact Disc Player, a second motor coil is used for moving the laser-unit in a radial direction with respect to the compact disc, and a third motor coil is used for tilting the laser-unit with respect to the compact disc. According to the advanced embodiment only four wire connections have to be made between the three motor coils of the laser-unit and the system of the invention. These four wire connections can be used as a practical suspension system for the laser-unit, whereas six wire connections would have made it hardly possible to realize a suspension system for the laser-unit.

In the accompanying drawings, in which certain modes of carrying out the present invention are shown for illustrative purposes:

Figure 1:
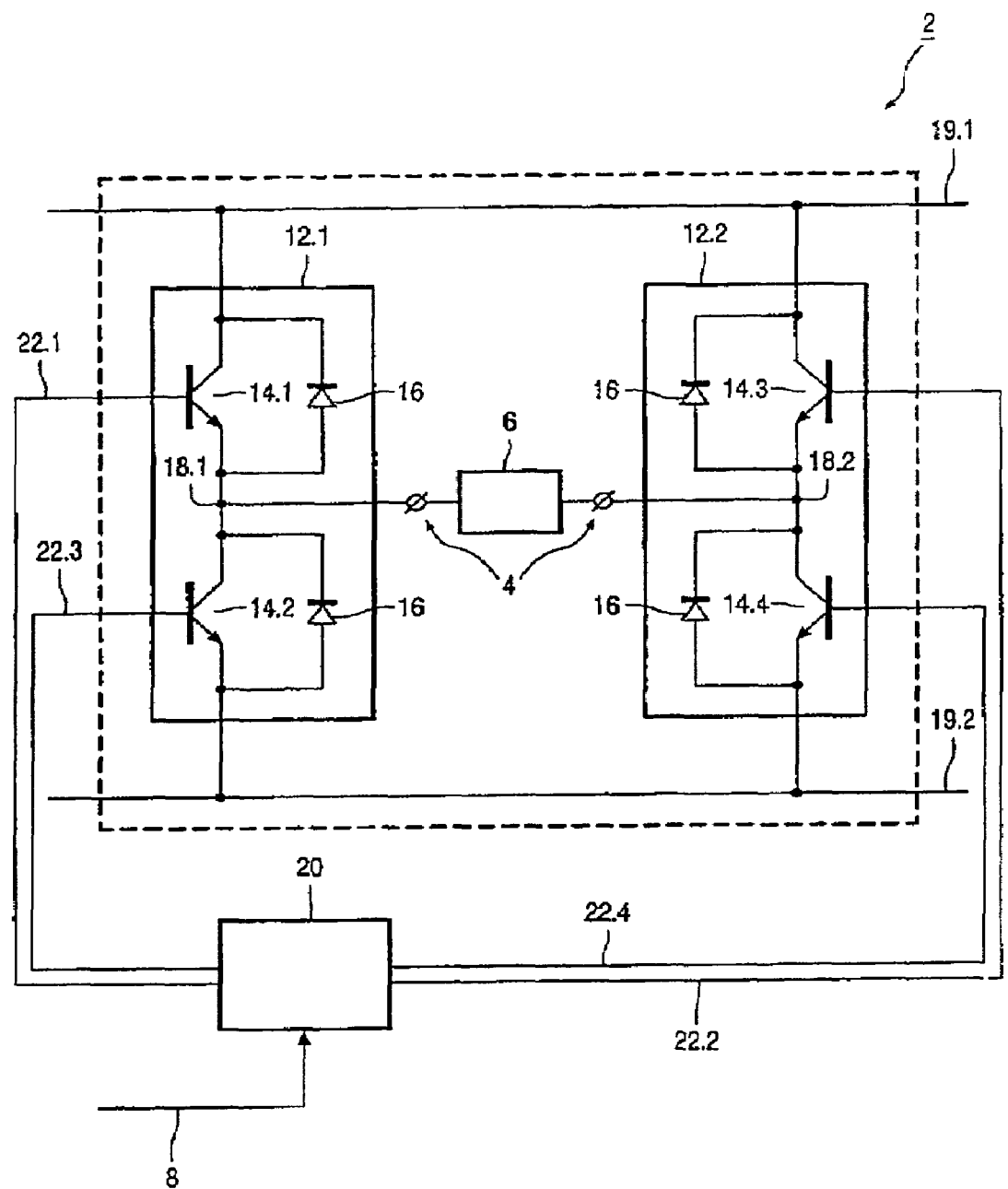
FIG. 1 is a schematic diagram of a system according to the invention.

FIG. 1 shows a system 2 for generating a PWM (Pulse Width Modulation) output voltage signal 4 over a load 6. In this example the PWM output voltage signal 4 is generated on the basis of a control signal 8. The system comprises a first half bridge 12.1 and a second half bridge 12.2. The first half bridge 12.1 comprises a series connection of a first switch 14.1 and a second switch 14.2 and the second half bridge 12.2 comprises a series connection of a third switch 14.3 and a fourth switch 14.4. Furthermore, the system 2 comprises "free wheeling diodes" 16 for preventing a short circuit during switching operation of the system 2.

The system 2 comprises a first junction 18.1 of the first switch 14.1 and the second switch 14.2 and a second junction 18.2 of the third switch 14.3 and the fourth switch 14.4. The first junction 18.1 can be used as a first output of the first half bridge 12.1 and the second junction 18.2 can be used as a second output of the second half bridge 12.2. In this example, the load 6 is connected with the first junction 18.1 and the second junction 18.2. The load 6 can for example be a coil of a motor, which can be controlled by the system 2.

Both the first half bridge 12.1 and the second half bridge 12.2 are connected between a first rail 19.1 and a second rail 19.2 for supplying a DC voltage over the first half bridge 12.1 and the second half bridge 12.2. In this example the first rail 19.1 is connected with a DC power supply with a first voltage ($V_1$) and the second rail 19.2 is connected with a DC power supply with a second voltage ($V_2$). The first switch 14.1 can be used for switching a connection between the first junction 18.1 and the first rail 19.1 and the second switch 14.2 can be used for switching a connection between the first junction 18.1 and the second rail 19.2. The third switch 14.3 can be used for switching a connection between the second junction 18.2 and the first rail 19.1 and the fourth switch 14.4 can be used for switching a connection between the second junction 18.2 and the second rail 19.2. In this example the switches are bi-polar transistor, but there are many alternatives such as MOSFETS etc.

The system 2 comprises a control unit 20 for generating PWM switch-signals for switching the switches. The control unit 20 can generate a first PWM switch-signal 22.1 for the first half bridge 12.1 and a second PWM switch-signal 22.2 for the second half bridge 12.2. The control unit 20 is arranged for varying the pulse widths and/or the phases of the first and second PWM switch-signals 12.1, 12.2 relative to each other for varying the pulse width of the PWM output voltage signal 4. In this example the first switch-signal 22.1 is fed to the first switch 14.1 for switching the first switch 22.1 and the second switch-signal 22.2 is fed to the third switch 14.3 for switching the third switch 14.3. Each switch-signal can be at a high level (in this example the value 1) wherein the corresponding switch is in a conduction state, or at a low level (in this example the value 0) wherein the corresponding switch is in a non-conduction state. Preferably, the switch-signals 22.1, 22.2 are generated on the basis of the control signal 8. In particular the switches are switched in such a way that the PWM output voltage signal 4 represents the input signal 8.

The control unit 20 also generates a switch-signal 22.3 for the switch 14.2 and a switch-signal 22.4 for the switch 14.4. In this example the switch-signal 22.3 is inversed with respect to the first PWM switch-signal 22.1, such that a short-circuit via the first half bridge 12.1 between the first rail 19.1 and the second rail 19.2 is prevented. Furthermore, the PWM switch-signal 22.4 is inversed with respect to the switch-signal 22.2 for preventing a short-circuit via the second half bridge 12.2.

Figure 2:
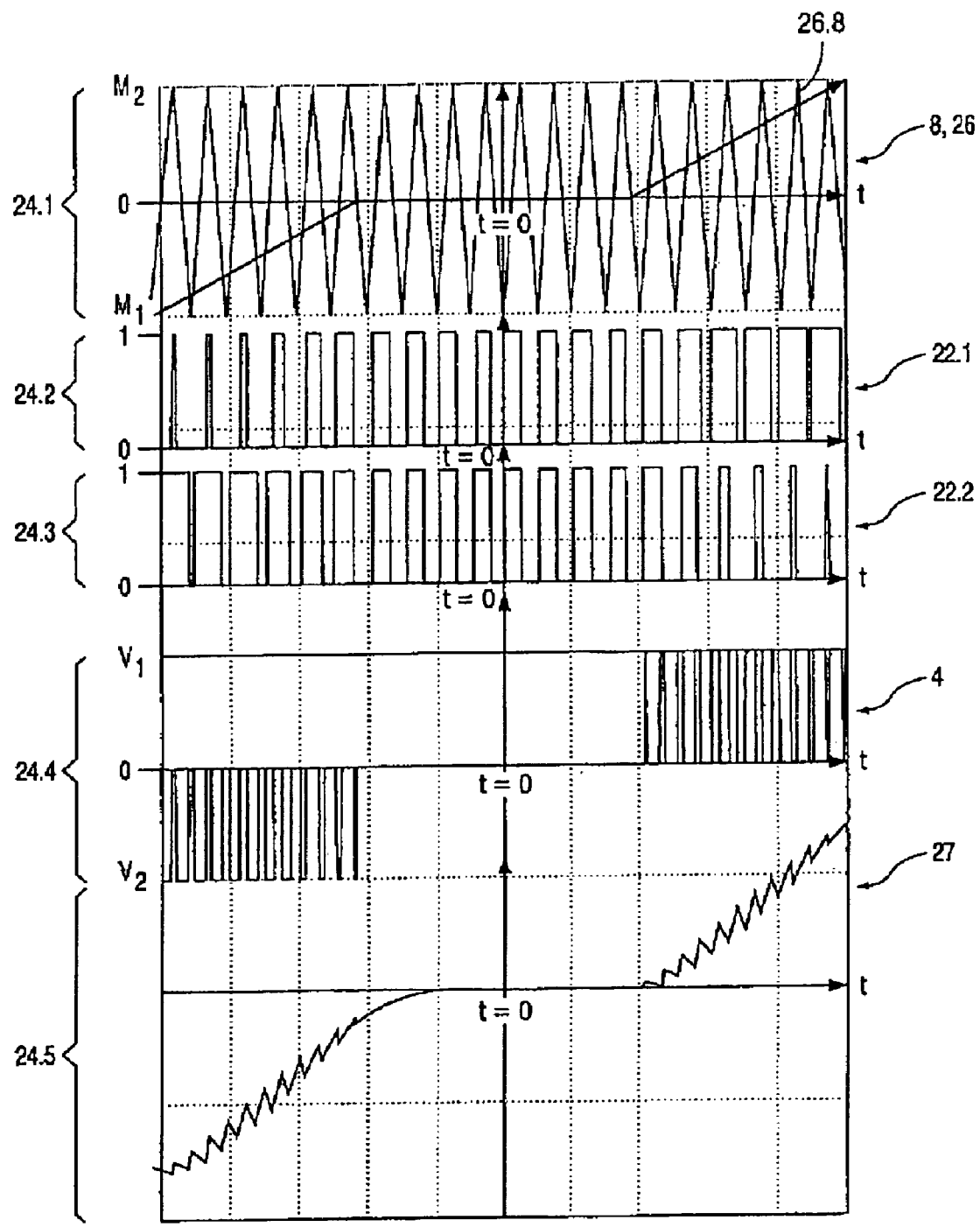
FIG. 2 is a schematic diagram showing an example of first and second switch-signals and the corresponding PWM output voltage signal according to a first embodiment of the system of the invention.

FIG. 2 is a schematic diagram showing an example of the first and second PWM switch-signals 22.1, 22.2 and the corresponding PWM output voltage signal 4 according to a first embodiment of the system of the invention. FIG. 2 comprises five coordinate systems 24.*j* (j=1, . . . , 5). The horizontal axis of each of the coordinate systems represents the time (all coordinate systems on the same scale in arbitrary units). The vertical axis of each coordinate system represents the magnitude of the corresponding signal.

The coordinate system 24.1 shows a control signal 8 which changes in an interval [$M_1$, $M_2$]. Furthermore, the coordinate system 24.1 shows an auxiliary signal ramp signal 26.

The coordinate system 24.2 shows the first switch-signal 22.1. The first switch-signal 22.1 is generated by the control unit on the basis of the control signal 8 and the auxiliary ramp signal 26. The control signal 8 is inversed and subsequently crossed with the auxiliary signal 26 (see coordinate system 24.1) which results in first intersection points. These first intersection points define the switching time points of the first switch-signal 22.1. The switch-signal 22.1 switches between a low level 0 (switch 14.1 in non-conduction state) and a high level 1 (switch 14.1 in conduction state). If the switch-signal 22.1 is 1 then the first junction 18.1 is at the first voltage ($V_1$) of the first rail 19.1. If the switch-signal 22.1 is 0 then the first junction 18.1 is at the second voltage ($V_2$) level of the second rail 19.2 (for in this case the switch-signal 22.3 for switch 14.2 equals the high-level 1, since the PWM switch-signal 22.3 is inversed with respect to PWM switch-signal 22.1).

The coordinate system 24.3 shows the second switch-signal 22.2. The second switch signal 22.2 is generated by the control unit 20 by crossing the control signal 8 with the auxiliary signal 26, which results in second intersection points. Subsequently, these second intersection points define the switching time points of the second switch-signal 22.2. The switch-signal 22.2 switches between 0 (switch 14.3 in non-conduction state) and 1 (switch 14.3 in conduction state). If the switch-signal 22.2 is 1 then the second junction 18.2 is at the first voltage ($V_1$) of the first rail 19.1. If the switch-signal 22.2 is zero then the second junction 18.2 is at the second voltage ($V_2$) of the second rail 19.2 (for in this case the switch-signal 22.4 for the switch 14.4 is an inversed version of the PWM switch-signal 22.2).

The control unit 20 feeds the system 2 with the switch-signals 22.*i* (i=1, . . . , 4) which yields the PWM output voltage signal 4 which is shown in coordinate system 24.4. The PWM output voltage signal changes between the said first voltage ($V_1$) and the said second voltage ($V_2$). From the coordinate system 24.4 it follows that, if the PWM output voltage signal 4 is zero, the respective pulse width and phase of the first PWM switch-signal 22.1 and the respective pulse width and phase of the second PWM switch-signal 22.4 are, at least substantially, equal. The PWM output voltage signal 4 results in an electrical current 27 over the load 6. This current 27 is shown in coordinate system 24.5. From coordinate system 24.5 it becomes clear that the current 27 through the load 6 is zero at the zero crossing of the PWM output voltage signal 4. Thus in the said zero crossings there is no development of heat in the motor.

An important aspect of the invention, which is shown in FIG. 2, is that the frequency of the PWM output voltage signal 4 and the current 27 are doubled with respect to the frequency of the PWM switch-signals 22.1 and 22.2. This offers opportunities for a very effective noise shaping.

Another aspect of the invention is that the system 2 according to the invention is highly linear. This is a consequence of the fact that there is no different behavior inside and outside the zero crossings of the PWM output voltage signal 4. In this example the duty cycles of the switch-signals 22.1, 22.2, 22.3 and 22.4 are monotonous functions of the control signal 8, without discontinuities at the said zero-crossings.

Another way of describing the PWM switch-signals 22.1 and 22.2 in FIG. 2 is as follows. The sum of the duty cycles of the first PWM switch-signal 22.1 and the second PWM switch-signal 22.2 is at least essentially equal to 100%. For varying the PWM output voltage signal 4 the duty cycles and/or the phases of the first and second PWM switch signals 22.1, 22.2 are varied relative to each other, wherein, for generating a zero PWM output voltage signal 4, the duty cycles and the phases of the first and second PWM switch-signals are equal to each other.

Figure 3A:
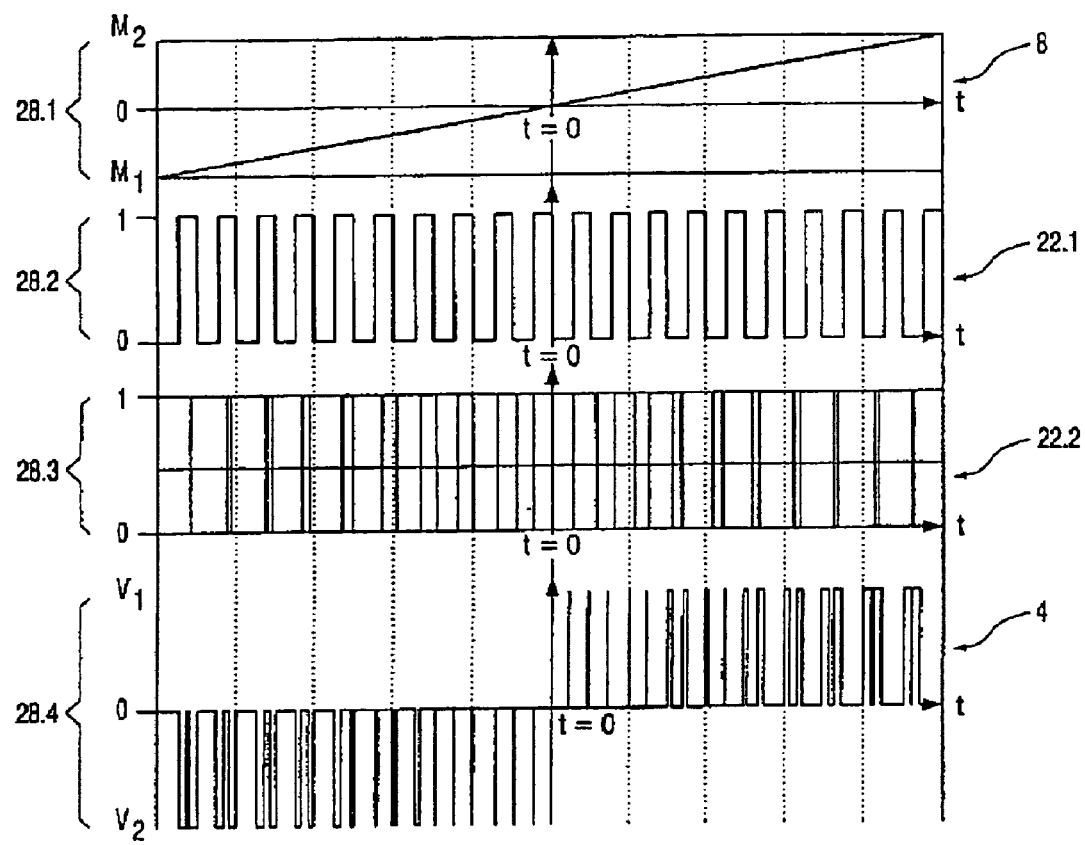
FIG. 3A is a schematic diagram showing a first example of first and second switch-signals and the corresponding PWM output voltage signal according to a second embodiment of the system of the invention.

FIG. 3A shows a first example for a second embodiment of the system according to the invention. FIG. 3A comprises four respective coordinate systems 28.*k* (k=1, . . . , 4) comprising respectively a control signal 8, a first switch-signal 22.1, a second switch-signal 22.2 and a PWM output voltage signal 4.1. The switch-signals 22.1, 22.2 are generated by the control unit 20 on the basis of the control signal 8. The control signal 8 is a straight line in this example. The coordinate systems 28.2 and 28.3 show that the switch-signals 22.1 and 22.2 are the same in a region around the zero-crossing of the PWM output voltage signal 4 (at t=0). (analogous to the situation in FIG. 2). Consequently, there is no electrical current through the load 6 at the zero-crossing of the input signal 8. Furthermore, it follows from FIG. 3A that the duty-cycle of the switch-signal 22.1 is a monotonous function of the control signal 8.

Figure 3B:
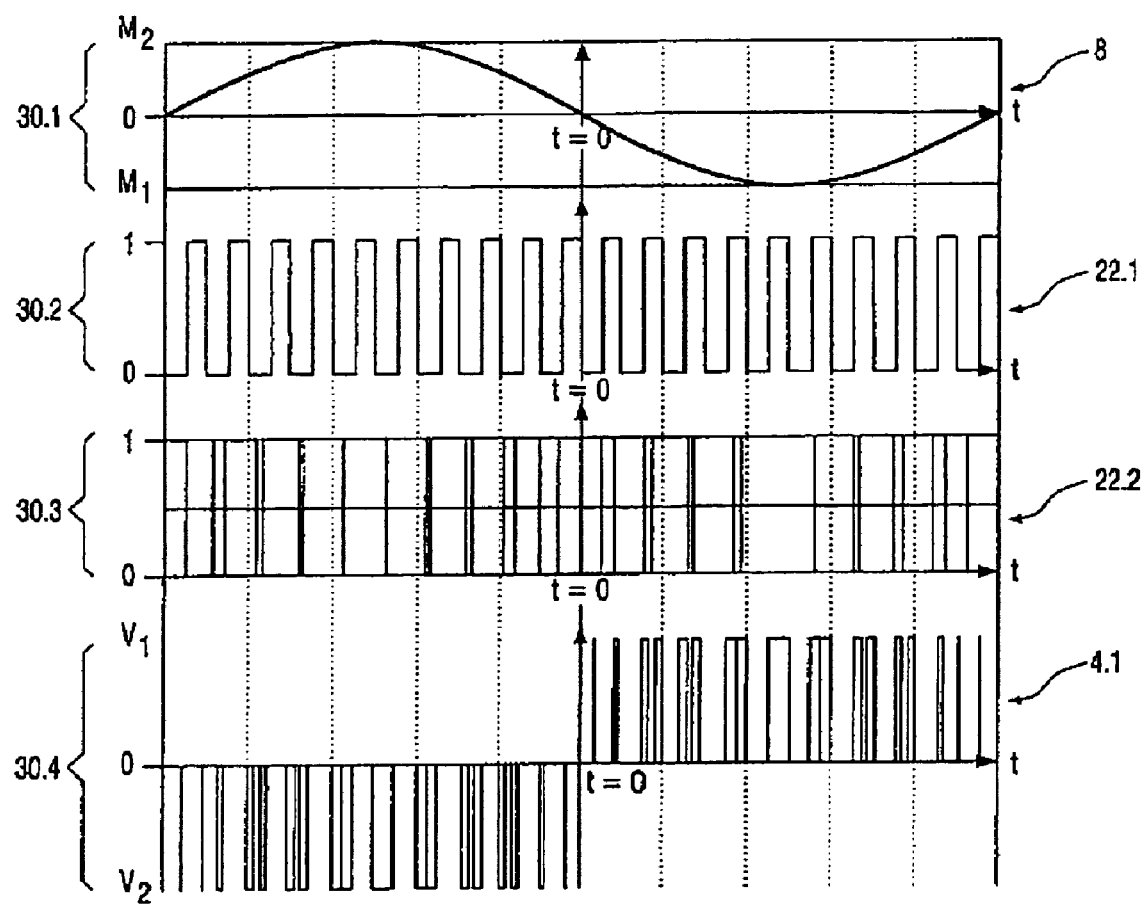
FIG. 3B is a schematic diagram showing a second example of first and second switch-signals and the corresponding PWM output voltage signal according to the second embodiment of the system of the invention.

FIG. 3B shows a second example for the second embodiment of the system according to the invention. FIG. 3B comprises four respective coordinate systems 30.*k* (k=1, . . . , 4) comprising respectively a control signal 8, a first switch-signal 22.1, a second switch-signal 22.2 and a PWM output voltage signal 4. The switch-signals 22.1, 22.2 are generated by the control unit 20 on the basis of the control signal 8. The control signal 8 is a sinusoid in this example. The coordinate systems 28.2 and 28.3 show that the switch-signals 22.1 and 22.2 are the same in a region around the zero-crossing at t=0 of the PWM output voltage signal 4 (analogous to the situation in FIG. 2). Consequently, there is no electrical current through the load 6 at the zero-crossing of the PWM output voltage signal 4. Furthermore, it follows from FIG. 33 that the duty-cycle of the switch-signal 22.1 is modulated by the control signal 8.

Another way of describing the switch-signals 22.1 and 22.2 in FIGS. 3A and 33 is as follows. The centers of the respective pulses of the first PWM switch-signal 22.1 are aligned with the centers of the respective pulses of the second PWM switch-signal 22.2. The first PWM switch-signal 22.1 has a fixed duty cycle of 50%. For varying the PWM output voltage signal 4, the duty cycle of the second PWM switch-signal 22.2 is varied relative to the duty cycle of the first PWM switch-signal 22.1, wherein, for generating a zero PWM output voltage 4, the duty cycle of the second PWM switch-signal is equal to the duty cycle of the first PWM switch-signal.

Figure 4:
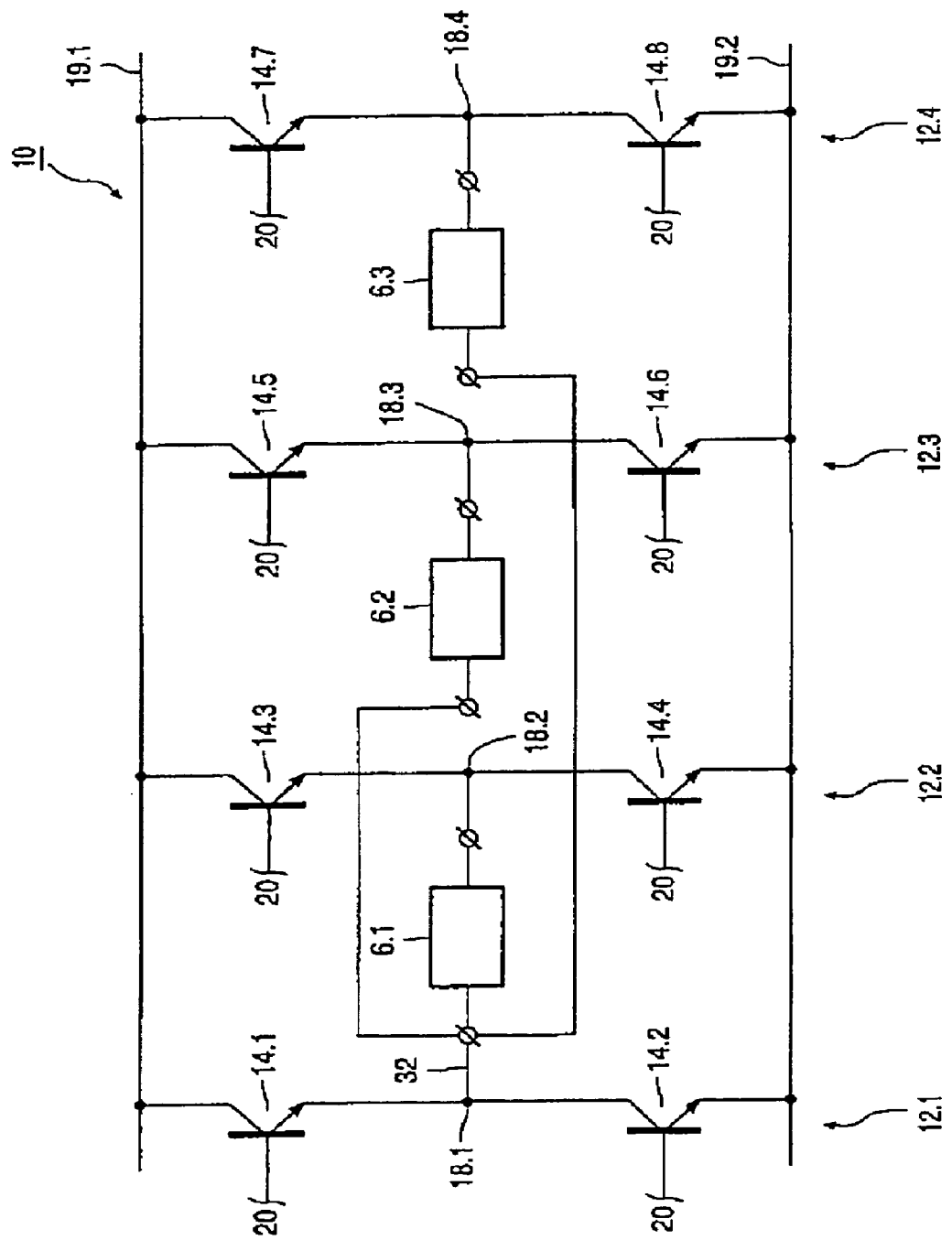
FIG. 4 is a schematic diagram of an embodiment of the system according to the invention suited for application in a Compact Disc Player.

FIG. 4 shows an embodiment of the system 2 of the invention. The system 2 comprises a third half bridge 123 and a fourth half bridge 12.4, wherein the third half bridge 12.3 comprises a series connection of a fifth switch 14.5 and a sixth switch 14.6 and wherein the fourth bridge 12.4 comprises a series connection of a seventh switch 14.7 and an eighth switch 14.8. The third half bridge 12.3 and the fourth half bridge 12.4 are connected between the first rail 19.1 and the second rail 19.2 for supplying the DC voltage over the third half bridge 12.3 and the fourth half bridge 12.4. Furthermore, a first motor coil 6.1 of an electrical motor is connected between the first junction 18.1 and the second junction 18.2, a second motor coil 6.2 of the electrical motor is connected between the first junction 181 and a third junction 18.3 of the fifth switch 145 and the sixth switch 14.6, and a third motor coil 6.3 of a the motor is connected between the first junction 18.1 and a fourth junction 18.4 of the seventh switch 14.7 and the eighth switch 14.8. The three said motor coils can for example be used for steering a laser unit (focus movement, tilt rotation, and radial movement) with respect to a compact disc in a Compact Disc Player.

As can be seen in FIG. 4, the junction 18.1 is connected with a first connection of coil 6.$p$ via a common wire 32 and a second connection of coil 6.$p$ is connected and only connected to the junction 18.($p$+1), p=1, 2, 3. In this way, the control unit 20 (not shown in FIG. 4) can independently control the motor coils 6.$p$ (p=1, 2, 3). Herewith, only four connection wires have to be used between the electrical bridge 10 and the coils. This enables a simple construction wherein the wires are used as a suspension system for the laser unit.

The invention has been described according to a few embodiments. However, it should be noted that the invention can be practiced otherwise than as specifically illustrated and described without departing from its spirit or scope.

The invention claimed is:

1. A system for generating a PWM output voltage signal for a load, wherein the system comprises:
    a first half bridge and a second half bridge, wherein the first half bridge comprises a series connection of a first switch and a second switch and wherein the second half bridge comprises a series connection of a third switch and a fourth switch,
    wherein the first half bridge and the second half bridge are connected between a first rail and a second rail for supplying a DC voltage over the first half bridge and the second half bridge, and
    wherein, in use, the load is connected between a first junction of the first switch and the second switch and a second junction of the third switch and the fourth switch, and
    a control unit configured for generating at least a first PWM switch-signal for switching the switches of the first half bridge and at least a second PWM switch-signal for switching the switches of the second half bridge,
    wherein the control unit is further configured for varying pulse widths and/or phases of the first and second PWM switch-signals relative to each other for varying a pulse width of the PWM output voltage signal,
    wherein, for generating a zero PWM output voltage signal, the control unit configured to generate the first PWM switch-signal and the second PWM switch-signal such that the respective pulse width and phase of the first PWM switch-signal and the respective pulse width and phase of the second PWM switch-signal are, at least substantially, equal.

2. The system according to claim 1, wherein the control unit is arranged for generating the first PWM switch-signal and the second PWM switch-signal on the basis of a control signal, wherein respective duty cycles of the respective first and second PWM switch-signals are continuous functions of the control signal.

3. The system according to claim 1, wherein the control unit is also arranged for generating a third PWM switch-signal and a fourth PWM switch-signal, wherein the first PWM switch-signal and the third PWM switch-signal are inversed signals with respect to each other, and wherein the second PWM switch-signal and the fourth PWM switch-signal are inversed signals with respect to each other, and wherein, in use, the first PWM switch-signal is fed to the first switch, the second PWM switch-signal is fed to the third switch, the third PWM switch-signal is fed to the second switch and the fourth PWM switch-signal is fed to the fourth switch.

4. The system according to claim 1, wherein the sum of duty cycles of the first PWM switch-signal and the second PWM switch-signal is at least essentially equal to 100%, wherein, in use, for varying the PWM output voltage signal, the duty cycles and/or the phases of the first and second PWM switch signals are varied relative to each other, and wherein, for generating a zero PWM output voltage signal, the duty cycles and the phases of the first and second PWM switch-signals are equal to each other.

5. The system according to claim 1, wherein centers of respective pulses of the first PWM switch-signal are aligned with centers of respective pulses of the second PWM switch-signal, wherein the first PWM switch-signal has a first fixed duty cycle and wherein in use, for varying the PWM output voltage signal, a duty cycle of the second PWM switch-signal is varied relatively to the first fixed duty cycle, wherein, for generating a zero PWM output voltage, the duty cycle of the second PWM switch-signal is equal to the first fixed duty cycle.

6. System according to claim 5, wherein the first fixed duty cycle is 50%.

7. The System according to claim 1, wherein the system comprises a third half bridge and a fourth half bridge, wherein the third half bridge comprises a series connection of a fifth switch and a sixth switch and wherein the fourth half bridge comprises a series connection of a seventh switch and an eighth switch, wherein the third half bridge and the fourth half bridge are connected between the first rail and the second rail for supplying the DC voltage over the third half bridge and the fourth half bridge, and wherein a first motor coil of an electrical motor is connected between the first junction and the second junction, wherein a second motor coil of the electrical motor is connected between the first junction and a third junction of the fifth switch and the sixth switch, and wherein a third motor coil of the electrical motor is connected between the first junction and a fourth junction of the seventh switch and the eighth switch.

8. A control unit of a system having a first half bridge and a second half bridge, said control unit being configured to:
    generate at least a first PWM switch-signal for switching switches of the first half bridge and at least a second PWM switch-signal for switching switches of the second half bridge;
    to vary at least one of pulse widths and phases of the first and second PWM switch-signals relative to each other for varying a pulse width of a PWM output voltage signal so that said PWM output voltage signal equals zero when said pulse widths of the first and second PWM switch-signals are equal to each other.

9. The control unit of claim 8, wherein said PWM output voltage signal equals zero when said phases of the first and second PWM switch-signals are equal to each other.

10. The control unit of claim 8, wherein the first half bridge comprises a series connection of a first switch and a second switch;

the second half bridge comprises a series connection of a third switch and a fourth switch;

the first half bridge and the second half bridge are connected between a first rail and a second rail for supplying a DC voltage over the first and second half bridge; and in use, the load is connected between a first junction of the first switch and the second switch and a second junction of the third switch and the fourth switch.

11. A system for generating a PWM output voltage signal, the system comprising:

a first half bridge having a first set of switches;

a second half bridge having a second set of switches; and a control unit configured to:

generate at least a first PWM switch-signal for switching said first set of switches;

generate at least a second PWM switch-signal for switching said second set of switches; and vary at least one of pulse widths and phases of the first and second PWM switch-signals relative to each other for varying a pulse width of a PWM output voltage signal so that said PWM output voltage signal equals zero when said pulse widths of the first and second PWM switch-signals are equal to each other.

12. The system of claim 11, wherein said first set of switches comprises a series connection of a first switch and a second switch;

the second set of switches comprises a series connection of a third switch and a fourth switch;

the first half bridge and the second half bridge are connected between a first rail and a second rail for supplying a DC voltage over the first and second half bridge; and in use, a load is connected between a first junction of the first switch and the second switch and a second junction of the third switch and the fourth switch.

13. The system of claim 11, further comprising a third half bridge, wherein a first load is connected between a first output of said first half bridge and a second output of said second half bridge, and a second load is connected between said first output and a third output of said third half bridge so that only three leads are used for connection to said first and second loads.

14. The system of claim 11, further comprising:

a third half bridge; and a fourth half bridge;

wherein a first load is connected between a first output of said first half bridge and a second output of said second half bridge, a second load is connected between said first output and a third output of said third half bridge, and a third load is connected between said first output and a third output of said third half bridge so that only four leads are used for connection to said first, second and third loads.

15. The system of claim 11, wherein a frequency of PWM output voltage signal is double a frequency of one of said first PWM switch-signal and said second PWM switch-signal.

* * * * *